United States Patent [19]

Hosoi et al.

[11] 4,316,783

[45] Feb. 23, 1982

[54] PROCESS FOR MODIFYING A SHAPED POLYETHYLENE

[75] Inventors: Fumio Hosoi; Takashi Sasaki, both of Takasaki; Miyuki Hagiwara, Maebashi; Noboru Kasai, Takasaki; Kunio Araki, Mito; Takayuki Hirano, Yokohama, all of Japan

[73] Assignee: Japan Atomic Energy Research Institute, Tokyo, Japan

[21] Appl. No.: 48,391

[22] Filed: Jun. 14, 1979

[30] Foreign Application Priority Data

Jun. 20, 1978 [JP] Japan .................................. 53-74562
Jun. 20, 1978 [JP] Japan .................................. 53-74563

[51] Int. Cl.$^3$ ............................. C08J 3/28; C08J 3/24
[52] U.S. Cl. ............................. 204/159.18; 204/159.2
[58] Field of Search ......................... 204/159.18, 159.2

[56] References Cited

U.S. PATENT DOCUMENTS 3,006,829 10/1961 Cook et al. .................... 204/159.18
3,121,674 2/1964 Guthrie ......................... 204/159.2
3,992,495 11/1976 Sano et al. ...................... 204/159.2

FOREIGN PATENT DOCUMENTS 1152534 8/1963 Fed. Rep. of Germany ....................... 204/159.18
44-7343 3/1969 Japan ............................. 204/159.17

OTHER PUBLICATIONS

Oda et al., "Vapor Phase Graft Polymerization onto Polymer Preirradiated in Air", *Preprints of Scientific Papers, International Symposium of Macromolecular Chemistry,* 1966.

Oda et al., "Vapor Phase Graft Polymerization onto Polymer Pre-irradiated in Air: Catalytic Effect of Amines", *Polymer Preprints,* Am. Chem. Soc., Div. of Poly Chem, vol. 9, No. 1, pp. 683-690.

*Primary Examiner*—Wilbert J. Briggs, Sr.
*Attorney, Agent, or Firm*—Browdy and Neimark

[57] ABSTRACT

An improved process for cross-linking a shaped polyethylene is herein disclosed comprising irradiating it with electron beams using 0.2 to 2 parts by weight of amine alone or in combination with 0.2 to 1.0 part by weight of alcohol for 100 parts by weight of polyethylene to thereby improve the electrical, mechanical, thermal and other characteristics of the polyethylene.

7 Claims, No Drawings

PROCESS FOR MODIFYING A SHAPED POLYETHYLENE

BACKGROUND OF THE INVENTION

1. Field of the Invention

This invention relates to a process for modifying a shaped polyethylene and more particularly to an improved process for cross-linking a shaped polyethylene by irradiating a sheet or hollow tube of polyethylene with electron beams to thereby improve the electrical, mechanical, thermal and other characteristics of the polyethylene.

2. Description of the Prior Art

It is known that polyethylene irradiated with an electron beam is cross-linked and has its mechanical, chemical and thermal characteristics improved significantly. Among techniques which have been used for such purpose on a commercial scale include one of irradiating a hollow tube of polyethylene with electron beams to render it highly heat resistant and of irradiating a thin film of polyethylene with electron beams to provide a heat resistant formed sheet. An electron beam accelerator is generally used to treat such shaped polyethylenes with an ionizing radiation because it provides a large dose of ionizing radiation relatively easily and requires only a short period of irradiation to improve the mechanical and thermal properties of the polyethylene. An accelerator generating electrons of higher energy is advantageous because it can be used to treat materials of various thicknesses, but because of its high price, accelerators generating electrons of low energy have been practically used and attempts have been made to its limited scope of application by making modifications of the way in which it is used. For instance, if the maximum range of penetration of an electron beam is smaller than the maximum thickness of rubber or plastics which is to be treated with such beams, a single irradiation in one direction cannot cover the entire thickness of the shaped article, and therefore, the article is first irradiated on one side and then turned over for another irradiation on the opposite side. However, this technique of irradiating rubber or shaped plastics of relatively large thickness has the disadvantage of developing hair cracks in the treated article and accordingly its electrical and mechanical characteristics are degraded. Such cracks presumably develop because electrons implanted by the irradiation gradually accumulate in the irradiated article, but their distribution or effects of the electric field formed has not been completely unravelled, nor has any method been established to prevent the formation of cracks. For this reason, irradiation of thick rubber or shaped plastics with an electron beam of a maximum penetration range smaller than the maximum thickness of the shaped article has been considered inadvisable, and as a result, the technique of using electron beams to modify rubber or shaped plastics has had a limited scope of application.

Therefore, development of a technique for irradiating rubber or shaped plastics with electron beams having a maximum thickness less than the maximum thickness of the shaped article has been considered indispensable to expanding the scope of use of the method of cross-linking a shaped article with electron beams.

SUMMARY OF THE INVENTION

It is one object of this invention to provide a process for irradiating a shaped polyethylene with electron beams at ambient temperatures and with a short period of irradiation to cross-link the polymer and provide it with improved electrical, mechanical and thermal characteristics.

It is another object of this invention to provide an improved process for cross-linking a shaped polyethylene by irradiating it with electron beams using 0.2 to 2 parts by weight of amine for 100 parts by weight of polyethylene.

It is a further object of this invention to provide an improved process for cross-linking a shaped polyethylene by irradiating it with electron beams using 0.2 to 1.0 part by weight of alcohol and less than 2 parts by weight, preferably 0.1 to 0.5 parts by weight of amine for 100 parts by weight of polyethylene.

Other objects and advantages of this invention will be apparent by reading the following background and detailed description of the invention.

DETAILED DESCRIPTION OF THE INVENTION

This invention relates to a process for modifying a shaped polyethylene, and more particularly to an improved process for cross-linking a shaped polyethylene by irradiating sheet or hollow tube of polyethylene with electron beams to thereby improve the electrical, mechanical, thermal and other characteristics of the polyethylene.

The present inventors studied on the electrical characteristics of polyethylene irradiated with ionizing radiations and noted that the volume resistivity of polyethylene decreases when irradiated in air, but that such decrease is checked by contacting the polyethylene with ammonia. This finding plus the ability of ammonia to capture cations has led the present inventors to take a fresh view that the volume resistivity of polyethylene irradiated with an ionizing radiation is decreased due to the cation produced in the shaped polyethylene upon irradiation with ionizing radiations. This possibility has further led to the inference that relatively stable cations resulting from irradiation with electron beams may affect the intensity of the electric field formed in the irradiated shaped article as well as constitute and important factor for electrical discharge breakdown, so-called "Lichtenberg breakdown". To verify this inference, the present inventors contacted a shaped polyethylene with gaseous ammonia for a suitable period of time before irradiation with electron beams and found that the resulting shaped polyethylene was free from the formation of hair cracks. This success matured into a new process for improving the mechanical and thermal properties of polyethylene without hair cracks (Japanese Printed patent application No. 56673/1979).

To unravel the mechanism of preventing the formation of hair cracks in a shaped polyethylene irradiated with electron beams, the present inventors measured thermal stimulated current to know the amount of electrical charge accumulated in the irradiated polyethylene and found that fewer charges were accumulated in a shaped polyethylene irradiated with electron beams in the presence of ammonia and that the same effect could be achieved by addition of an amine compound. The present inventors then added amines known as a stabilizer for the dielectric strength of rubber or plastic insulator, that is, 2,4-dinitroaniline, N,N'-diphenyl-p-phenylenediamine and β-naphthylamine to polyethylene before irradiation with electron beams, but unexpectedly enough, hair cracks developed in the polyethylene although it was irradiated with only a small dose of electron beams. Therefore, the present inventors tried for other amines and found that a shaped polyethylene treated with amines having a basicity of 9.5 or less in terms of pKb proved to have good mechanical, thermal and electrical properties without developing hair cracks upon irradiation with electron beams.

However, we have also found that an increase in the amount of ammonia or a specific amine used in the process defined above is accompanied by retardation of cross-linking of polyethylene during irradiation with electron beams. Especially, in a system using a cross-linking accelerator and amine, cross-linking of polyethylene is little inhibited if a small amount of amine is used, but then, development of hair cracks is not effectively prevented. On the other hand, if an increased amount of amine is used, the intended purpose of preventing the formation of hair cracks is achieved but due to retardation of cross-linking, the effect of adding the cross-linking agent is not achieved to the fullest, and as a result, a formed polyethylene with high degree of cross-linking cannot be produced without using a significantly large dose of electron beams.

The present inventors have therefore proceeded with the study in an attempt to eliminate such disadvantages and have unexpectedly found that the combination of amine and alcohol, either of which if used alone cannot effectively prevent the development of hair cracks, successfully provides a shaped polyethylene of high mechanical, electrical and thermal properties without development of hair cracks if the amount of amine used is decreased. In addition, the present inventors have found that combining alcohol with an amine of basicity not sufficient to effectively inhibit the formation of hair cracks results in effective prevention of such cracks without imparing the efficiency of cross-linking.

Such is the background of this invention which relates to an improved process for cross-linking a formed polyethylene by irradiating it with electron beams using 0.2 to 2 parts by weight of amine alone or 2 parts or less, preferably 0.1 to 0.5 parts by weight of amine in combination with 0.2 to 1.0 part by weight of alcohol for 100 parts by weight of polyethylene.

By the term "amine" used herein is meant amines having a basicity of 9.5 in pKb or less and which are generally primary, secondary and tertiary amines having the formulae:

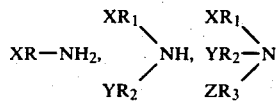

(wherein $XR_1$, $YR_2$ and $ZR_3$ are each an alkyl group, alkenyl group, alkyl group or aryl group). While $X=Y=Z=H$ (hydrogen) in these formulae, it is to be understood that the amine according to this invention may include those wherein X, Y and Z are a hydroxyl group or phenyl group. Typical examples of such substituted amines are primary, secondary and tertiary alkylamines having from 3 to 12 carbon atoms such as propylamine, n-hexylamine, n-ethylhexyl amine, n-heptylamine, n-octylamine, laurylamine, di-n-propylamine, di-n-hexyl amine, di-n-octylamine, tri-n-propylamine and so forth, diamines such as ethylenediamine, N-ethylethylene diamine, N,N'-diethylethylenediamine, trimethylenediamine, 1,4-diaminobutane and so forth, aromatic amines such as aniline, p-phenylenediamine, N,N'-diethyl-o-toluidine and so forth and alcohol amines such as monoethanolamine, diethanolamine, triethanolamine and so forth.

Alcohols used in this invention are monohydric, dihydric and trihydric aliphatic alcohols. However, taking the effect on the prevention of discharge breakdown and easy processing into consideration, the alcohols having a melting point of 50° C. or less and a boiling point of 130° C. or more are preferably used. Typical examples of such alcohols are n-amylalcohol, iso-amylalcohol, n-hexylalcohol, n-heptylalcohol, n-octylalcohol, ethyleneglycohol, propyleneglycohol, 1,3-propanediol, 1,3-butanediol, 2,4-pentanediol, glycerine and so forth.

According to the process of this invention, an amine or both amine and alcohol need be added to a shaped polyethylene before it is exposed to electron beams, and there is no particular limitation to the method of adding them. Among possible methods are: contacting the polyethylene with amine in gaseous or liquid phase; using an extruder or hot rolls to mix polyethylene with amine in molten state before shaping; contacting gaseous or liquid amine with a molten mixture of polyethylene and alcohol formed through an extruder or hot rolls; or forming a molten mixture of polyethylene, alcohol and amine using an extruder or hot rolls.

Whichever method is used, it is necessary for the purpose of effectively preventing the formation of hair cracks to uniformly diffuse or disperse amine or both amine and alcohol into the shaped polyethylene; a uniform diffusion of amine or both amine and alcohol into the polyethylene is advantageously provided by hot rolls. Therefore, it is preferable that the amine should have a boiling point at a temperature higher than the temperature for shaping the polyethylene.

Small voids of foreign matter present in a shaped polyethylene may be the cause of hair cracks upon irradiation with electron beams. It is generally known that a high-melting substance incorporated into a shaped polyethylene will crystallize in the polyethylene and either contribute to the formation of hair cracks or act as foreign matter. In consideration of this generally established mechanism, it is desired for the purpose of this invention to use amines having a melting point of 50° C. or less.

The amines defined above and which are uniformly diffused into polyethylene through contact or melt mixing are used in an amount of 0.2 to 2, preferably from 0.5 to 1 part by weight per 100 parts by weight of polyethylene. The amine used in an amount less than 0.2 parts by weight is not effective for preventing hair cracks, and using more than 2 parts by weight of amine contributes nothing to a further increase in the intended effect.

Alcohol is used in an amount of 0.2 to 2 parts by weight, preferably 0.5 to 1.0 part by weight per 100 parts by weight of polyethylene. Alcohol used in an amount less than 0.2 parts by weight does not effectively combine with amine to prevent formation of hair cracks, whereas the intended effect is saturated when 2 parts by weight of alcohol is used and no improvement in the effect is obtained by using more than 2 parts by weight of alcohol.

The principle of this invention is also effectively applicable to a method of irradiating a formed polyethylene with electron beams to cross-link a shaped polyethylene during irradiation with electron beams in the presence of a conventional cross-linking agent such as diallyl maleate, ethylene glycol dimethacrylate, triallylcyanurate, dipropargyl monoallyl cyanurate, dipropargylmaleate and so forth.

The result is a shaped polyethylene with improved mechanical, electrical and thermal properties without hair cracks and requiring only a short period of irradiation at ambient temperatures. As the dose at which hair cracks are formed in the shaped polyethylene depends on a cross-linking agent used, it is necessary that alcohol be combined with a suitable amine selected from the amines above defined depending upon the chosen cross-linking agent as well as the intended degree of cross-linking. To provide a shaped polyethylene with an improved thermal aging property according to this invention, a known antioxidant may be added to the polyethylene before irradiation with electron beams. Preferred examples of the antioxidant are aromatic amines such as N,N'-di-$\beta$-naphtyl-p-phenylene diamine and phenolic antioxidant such as tetrakis-[methylene-(3,5-di-t-butyl-4-hydroxyhydrocinnamate)]methane.

The "shaped polyethylene" as used herein means a high-density or low-density polyethylene, ethylene-propylene copolymer, ethylene-vinyl acetate copolymer, ethylene-methyl acrylate copolymer, ethylene-acrylonitrile copolymer, ethylene copolymers and mixtures of these copolymers with other polymers as shaped into a sheet form, hollow pipe, hollow tube, electric wire or cable insulated with one of these polymers or copolymers and other forms having a maximum thickness of at least about 4 mm. The shaped polyethylene to be irradiated with electron beams according to this invention is defined to have a maximum thickness of at least about 4 mm in the direction of electron beams transmitting through the polyethylene because few cracks will scarcely develop in shaped polyethylene less than 4 mm thick, and thus causing no practical problem in irradiation with electron beams. The electron beams that are suitable for use in this invention are defined to have a maximum range smaller than the maximum thickness of polyethylene to be irradiated therewith because irradiation with electron beams having a maximum range larger than the maximum thickness of shaped polyethylene will not result in the formation of any hair cracks in the polyethylene.

By the term "maximum range of electron beams" as used herein is meant the maximum distance that can be covered by an electron beam transmitting through an object. For instance, electron beams accelerated to an energy of 500 KeV, 1 MeV or 2 MeV have maximum penetration ranges of about 2 mm, 4 mm and 11 mm, respectively in a rubber or plastic material having a specific density.

It is to be noted that the dose rate of electron beams with which a shaped polyethylene is irradiated according to this invention may be suitably determined by the kind of polyethylene used, maximum thickness of the polyethylene, dose and time required for modifying the properties of the shaped polyethylene.

This invention is now described in greater detail by reference to the following examples, which are given here for illustrative purposes only and are by no means meant to limit the scope of this invention.

EXAMPLE 1

Four samples of commercially available low density polyethylene (d=0.92, Ml=2) each being 100 parts by weight was mixed with 2 parts by weight of aniline, N,N-diethyl-o-toluidine, 2-ethylhexylamine and di-n-hexylamine, respectively, and each mixture was rolled at 120° C. and heat pressed into a 10×10 cm shaped article having a substantially uniform thickness of 10 mm. Each sample was coated with an electricaly conductive paint on both sides to make electrodes thereof and irradiated at intervals of 30 seconds with electron beam of 1.75 MeV, at a current of 1 mA and a dose rate of $1 \times 10^5$ rad/sec until development of hair cracks was observed within the shaped polyethylene. To identify the development of hair cracks, irradiated surface of polyethylene was grounded, the opposite surface was connected to an ammeter, and the current produced by irradiation with electron beams on the side opposite to the exposed side was measured. By checking a sudden increase in the measured current which occurred upon development of hair cracks in the polyethylene irradiated with the electron beam, this method could achieve accurate measurement of the dose required to form hair cracks (to be hereunder referred to as "discharged breakdown dose"). It is to be noted here that an electron beam accelerated at 1.75 MeV has a maximum range of about 8.6 mm in the shaped polyethylene under irradiation.

As controls, an amine-less sample and a sample containing 2,4-dinitroaniline or N,N'-diphenyl-p-phenylene diamine were irradiated with electron beams and checked for the discharge breakdown dose. The results of measurement are shown in Table 1 below. Table 1 also sets forth the gel ratio or the proportion of polyethylene insoluble in xylene after irradiation to the dose of 25 Mrad. of electron beams.

As can be seen from Table 1, a shaped polyethylene containing aniline, N,N'-diethyl-o-toluidine, 2-ethylhexylamine and di-n-hexylamine was free from hair cracks upon completion of irradiation to 36 Mrad., thus bespeaking the effect of aromatic amine or aliphatic amine of relatively strong basicity in preventing the formation of hair cracks. Table 1 also shows that the addition of such amines has substantially no adverse effect on the degree of cross-linking.

TABLE 1

| | Additive | Basicity of amine[1] pKb (25° C.) | discharge breakdown dose[2] (Mrad) | gel (%)[3] |
|---|---|---|---|---|
| | None | | 9.9 | 76 |
| Controls | 2,4-dinitroailine | >13.7 | 20.4 | 74 |
| | N,N'-diphenyl-p-phenylene-diamine | * | 0.1 | 68 |
| | Aniline | 9.4 | >36.0 | 73 |
| Example 1 | N,N-diphenyl-o-toluidine | 6.8 | >36.0 | 71 |
| | 2-ethylhexylamine | 3.2 | >36.0 | 79 |
| | di-n-hexylamine | 3.0 | >36.0 | 67 |

[1]In aqueous solution at 25° C.; * N,N-diphenyl-p-phenylenediamine is presumed to have a pKb in the range of from 7.9 to 13.2
[2]Dose at which hair cracks develop: >36.0 indicates the absence of breakdown under irradiation to 36 Mrad of electron beam
[3]The proportion of polyethylene insoluble in boiling xylene after irradiation to 25 Mrad of electron beams; extraction period of 100 hours

EXAMPLE 2

Two samples of commercially available low-density (d=0.92, MI=2) each being 100 parts by weight was mixed with polyethylene 1 part by weight of di-n-hexylamine or triethanol amine in the presence of 2 parts by weight of dipropargyl maleate as a cross-linking agent, and each mixture was shaped into a 10×10 cm sheet having a substantially uniform thickness of 10 mm in the same manner as used in Example 1. Each sheet was coated with an electrically conductive paint on both sides and irradiated with electron beams at 30° C. and checked for the discharge breakdown dose under the same conditions as specified in Example 1.

Two controls were prepared; one was from a mixture of 100 parts by weight of the same polyethylene and 2 parts by weight of dipropargyl maleate, and the other was from a mixture of 100 parts by weight of the polymer with 1 part by weight of aniline as well as 2 parts by weight of dipropargyl maleate. The thus prepared controls were shaped into sheets, exposed to electron beams at 30° C. and measured for the discharge breakdown dose in the same manner as described above.

The results of measurement are shown in Table 2 below. As can be seen from Table 2, in the presence of dipropargyl maleate as a cross-linking agent, N,N'-diphenyl-p-phenylene diamine having low basicity cannot effectively prevent the formation of hair cracks, whereas triethanol amine or di-n-hexylamine of high basicity can effectively prevent hair cracks in the shaped article of polyethylene.

TABLE 2

| | cross-linking agent | amine | Basicity of amine[1] pKb at 25° C. | discharge breakdown dose (Mrad) |
|---|---|---|---|---|
| Controls | dipropargyl maleate | None | | 3.0–5.5 |
| | | N,N'-diphenyl-p-phenylene diamine | * | 2.4 |
| Example 2 | dipropargyl maleate | triethanol amine | 6.2 | >36.0[2] |
| | | di-n-hexylamine | 3.0 | >36.0[2] |

[1]In aqueous solution at 25° C.; *N,N'-diphenyl-p-phenylene diamine is presumed to have a pKb in the range of from 7.9 to 13.2
[2]>36.0 indicates the absence of breakdown under irradiation with 36 Mrad of electron beam

EXAMPLE 3

100 parts by weight of the polyethylene used in Example 2 was mixed with 2 parts by weight of dipropargyl maleate as a cross-linking agent and then with 1 or 0.5 parts by weight of diethanol amine, and the mixture was shaped into a 10×10 cm sheet having a substantially uniform thickness of 10 mm according to the manner described in Example 1. The sheet was coated with an electrically conductive paint on both sides, irradiated with electron beams at 30° C. and checked for the discharge breakdown dose under the same conditions as specified in Example 1. As a control, polyethylene containing no dipropargyl maleate was treated and checked for the discharge breakdown dose in the same manner as described above.

The results of measurement are shown in Table 3 below. As can be seen from Table 3, the shaped polyethylene cross-linked by the process of this invention was free from the formation of hair cracks in various amounts of amine added to it in the presence of the cross-linking agent.

TABLE 3

| | cross-linking agent | diethanol amine (parts by weight) | basicity of amine[1] pKb at 25° C. | discharge breakdown dose (Mrad) |
|---|---|---|---|---|
| Control | dipropargyl maleate | 0.0 | | 3.0–5.5 |
| Example | dipropargyl maleate | 1.0 | 5.0 | >36.0[2] |
| | | 0.5 | 5.0 | >36.0[2] |

[1]In aqueous solution at 25° C.
[2]>36.0 Mrad indicates the absence of hair cracks after irradiation with 36 Mrad of electron beam

EXAMPLE 4

Three samples of the polyethylene used in Example 2 each being 100 parts by weight were mixed with 2 parts by weight of ethylene glycol dimethacrylate, diallyl maleate, and dipropargyl monoallyl cyanurate each as a cross-linking agent, and further mixed with 1 part by weight of diethanol amine, and each mixture was shaped into a 10×10 cm sheet having a substantially uniform thickness of 10 mm. Each sheet was coated with an electrically conductive paint on both sides, irradiated with electron beams at 30° C. and checked for the discharge breakdown dose in the same manner as described in Example 1.

Controls were prepared from a mixture of the polyethylene and one of the cross-linking agents mentioned above, and measured for the discharge breakdown dose in accordance with the same method as described above. The results of measurement are shown in Table 4 below. As can be seen from Table 4, diethanol amine having high basicity contained in the shaped polyethylene effectively prevents the formation of hair cracks.

TABLE 4

| Additive | diethanolamine (parts by weight) | discharge breakdown dose[2] (Mrad) |
|---|---|---|
| ethyleneglycol dimethacrylate | 1.0 | >36.0 |
| | 0.0[1] | 0.3 |
| diallylmaleate | 1.0 | >36.0 |
| | 0.0[1] | 2.2 |
| dipropargyl monoallylcyanurate | 1.0 | >15.0 |
| | 0.0[1] | 6.6 |

[1]Controls
[2]>36.0 and >15.0 indicate the absence of hair cracks upon irradiation with 36 Mrad amd 15 Mrad of electron beam, respectively

EXAMPLE 5

A sample of 100 parts by weight of commercially available low-density polyethylene (d=0.92, MI=1.0) was mixed with 2 parts by weight of dipropargyl maleate as a cross-linking agent, then with 0.2 parts by weight and 0.5 parts by weight of diethanol amine and 1,4-butane diol, respectively, and the resulting mixture was rolled at 120° C. and heat pressed into a 10×10 cm shaped article having a substantially uniform thickness of 10 mm (composition A). The sample was coated with an electrically conductive paint on both sides to make electrodes thereof and irradiated at intervals of 30 seconds with electron beams at 1.75 MeV, a current of 1 mA and a dose rate of $1 \times 10^5$ rad/sec until development of hair cracks were observed within the shaped polyethylene. The development of hair cracks was identified by the same method as described in Example 1.

Four controls were prepared; one consisted of only polyethylene; the second contained dipropargyl maleate only; the third contained a mixture of dipropargyl maleate and diethanol amine; and the fourth contained a mixture of dipropargyl maleate and 1,4-butane diol. These controls were irradiated with electron beams and measured for the discharge breakdown dose in the same manner as described above. The results are shown in Table 5 below. The Table also sets forth the gel ratio or the proportion of polyethylene insoluble in xylene after exposure to 10 Mrad of electron beams.

As can be seen from Table 5, a shaped polyethylene containing a mixture of diethanol amine and 1,4-butane diol was free from hair cracks even under irradiation with 36 Mrad of electron beams, indicative of a combined effect of amine and alcohol to prevent the formation of hair cracks in the polyethylene. Table 5 also shows that the amine and alcohol added to the polyethylene has no adverse effect on the cross-linking of the polyethylene in the presence of dipropargyl maleate.

TABLE 5

| | Additive (parts by weight) | discharge breakdown dose[1] (Mrad) | gel %[2] |
|---|---|---|---|
| Example 5 | dipropargyl maleate (2.0), diethanolamine (0.2) 1,4-butanediol (0.5) (Composition A) | >36.0 | 76 |
| Control | None | 9.9 | 64 |
| | dipropargyl maleate (2.0) | 2.4 | 79 |
| | dipropargyl maleate (2.0), diethanolamine (0.2) | 7.6 | 76 |
| | dipropargyl maleate (2.0), 1,4-butanediol (0.5) | 10.0 | 76 |

[1] >36.0 as a discharge breakdown dose indicates the absence of breakdown upon irradiation with 36 Mrad of electron beam
[2] The proportion of polyethylene insoluble in boiling xylene after irradiation with 10 Mrad of electron beam; extraction period of 100 hours

EXAMPLE 6

The diethanol amine contained in Composition A of Example 5 was replaced by 0.2 parts by weight of monoethanol amine and 0.2 parts by weight of di-n-hexylamine to prepare Compositions B and C, respectively. To each of the resulting compositions was added 1.0 part by weight of alcohol, and the mixture was shaped, irradiated with electron beams and checked for the discharge breakdown dose in the same manner as described in Example 5.

Three controls were prepared; one from the polyethylene and a mixture of 2.0 parts by weight of dipropargyl maleate and 0.2 parts by weight of monoethanol amine, the second contained a mixture of 2.0 parts by weight of dipropargyl maleate and 1.0 part by weight of di-n-hexyl amine, and the third contained a mixture of 2.0 parts by weight of dipropargyl maleate and 0.2 parts by weight of di-n-hexyl amine. The thus prepared controls were shaped, irradiated with electron beams, and checked for the discharge breakdown dose in the same procedure as described above.

Each sample and control was exposed to 10 Mrad of electron beams, immersed in boiling xylene to measure the gel ratio or the proportion of polyethylene which was insoluble in boiling xylene.

The results of measurement of breakdown discharge dose and gel ratio of each irradiated sample are shown in Table 6 below.

As can be seen from Table 6, monoethanol amine which is low in basicity exhibits little effect in preventing the formation of cracks but becomes effective when it is combined with alcohol. In addition, di-n-hexyl amine which is ineffective when used in an amount of 0.2 parts by weight proves to be effective in preventing hair cracks if it is combined with alcohol. Whether Composition B or C is used, the adverse effect it has on the cross-linking of polyethylene is negligibly small.

TABLE 6

| | Additive (parts by weight) | discharge breakdown dose[1] (Mrad) | gel %[2] |
|---|---|---|---|
| Example 6 | dipropargyl maleate (2.0), monoethanolamine (0.2) 1,4-butanediol (1.0) (Composition B) | >36.0 | 73 |
| 6 | dipropargyl maleate (2.0), di-n-hexylamine (0.2) 1,4-butanediol (1.0) (Composition C) | >36.0 | 73 |
| Control | dipropargyl maleate (2.0), monoethanolamine (0.2) | 7.0 | 73 |
| | dipropargyl maleate (2.0), di-n-hexylamine (1.0) | >36.0 | 53 |
| | dipropargyl maleate (2.0), di-n-hexylamine (0.2) | 23.6 | 73 |

[1] >36.0 as a breakdown discharge dose indicates the absence of breakdown even under irradiation with 36 Mrad of electron beam
[2] The proportion of polyethylene insoluble in boiling xylene after irradiation with 10 Mrad of electron beam; extraction period of 100 hours

EXAMPLE 7

The 1,4-butanediol contained in Composition A of Example 5 in an amount of 0.5 parts by weight was replaced by 1.0 part by weight of the same compound, or 1.0 part by weight of 1,5-pentane diol, 1.0 part by weight of n-octylalcohol. Each of the resulting compositions was shaped, irradiated with electron beams and checked for the discharge breakdown dose in the same manner as described in Example 5.

Four controls were prepared having the compositions indicated in Table 7 below. They were shaped, irradiated and measured for the discharge breakdown dose in the same manner as described above.

The results of measurement are also shown in Table 7.

As can be seen from Table 7, independent use of amine or alcohol is not effective for preventing the formation of hair cracks in a shaped polyethylene while it is irradiated with electron beams in the presence of a cross-linking agent, but a combination of amine and alcohol effectively prevents the formation of such cracks. In addition, the adverse effect of alcohol on the cross-linking of polyethylene is negligibly small.

TABLE 7

| | Additive (parts by weight) | discharge breakdown dose[1] (Mrad) | gel %[2] |
|---|---|---|---|
| Example 7 | dipropargyl maleate (2,0), diethanolamine (0.2) 1,4-butanediol (1.0) (Composition C) | >36.0 | 78 |
| | dipropargyl maleate (2.0), diethanolamine (0.2) 1,5-pentanediol (1.0) | >36.0 | 76 |
| | dipropargyl maleate (2.0), diethanolamine (0.2) n-octylalcohol (1.0) | >36.0 | 74 |
| Control | dipropargyl maleate (2.0), diethanolamine (0.2) | 7.6 | 78 |
| | dipropargyl maleate (2.0), 1,4-butanediol (1.0) | 10.0 | 76 |
| | dipropargyl maleate (2.0), 1,5-pentanediol (1.0) | 13.5 | 78 |
| | dipropargyl maleate (2.0), | | |

TABLE 7-continued

| Additive (parts by weight) | discharge breakdown dose[1] (Mrad) | gel %[2] |
|---|---|---|
| n-octylalcohol (1.0) | 10.0 | 74 |

[1] >36.0 as a discharge breakdown dose indicates the absence of breakdown under irradiation with 36 Mrad of electron beam
[2] The proportion of polyethylene insoluble in boiling xylene after irradiation with 10 Mrad of electron beam; extraction period of 100 hours

EXAMPLE 8

Two parts by weight of dipropargyl maleate contained in composition C of Example 7 were replaced by an equal amount of ethylene glycol dimethacrylate or diallyl maleate, and each composition prepared was shaped, irradiated and checked for the discharge breakdown dose in the same manner as described in Example 5.

Two controls were prepared; one containing only ethylene glycol dimethacrylate, and the other containing only diallyl maleate. They were shaped, irradiated and checked for the discharge breakdown dose in the same manner described above. The results of measurement are shown in Table 8 below.

As can be seen from Table 8, the shaped polyethylene containing only the cross-linking agent developed hair cracks due to breakdown discharge upon irradiation with electron beams. However, the shaped polyethylene containing a combination of amine and alcohol was free from the formation of such cracks and had its properties improved without loss of the efficiency of cross-linking.

TABLE 8

| | Additive (parts by weight) | discharge breakdown dose[1] (Mrad) | gel %[2] |
|---|---|---|---|
| Example 8 | ethyleneglycol dimethacrylate (2.0), diethanol amine (0.2) 1,4-butanediol (1.0) | >36.0 | 64 |
| | diallyl maleate (2.0), diethanolamine (0.2) 1,4-butanediol (1.0) | >36.0 | 74 |
| Control | ethyleneglycol dimethacrylate (2.0) | 0.3 | 65 |
| | diallyl maleate | 2.2 | 74 |

[1] >36.0 as a discharge breakdown dose indicates the absence of breakdown upon irradiation with 36 Mrad of electron beam
[2] The proportion of polyethylene insoluble in boiling xylene after irradiation with 10 Mrad of electron beam; extraction peiriod of 100 hours

EXAMPLE 9

Two parts by weight of dipropargyl maleate used in Composition B of Example 6 as cross-linking agent was replaced by 2 parts by weight of triallyl cyanurate, and the resulting composition was shaped, irradiated and checked for the discharge breakdown dose in the same manner as described in Example 5 above.

Two controls were prepared; one containing only triallyl cyanurate, and the other containing di-n-hexyl amine as well as triallyl cyanurate. They were irradiated and checked for the discharge breakdown dose in the same manner described above. The results of measurement are shown in Table 9 below.

As can be seen from Table 9, the shaped polyethylene containing triallyl cyanurate independently or as a mixture with 0.2 parts by weight of di-n-hexylamine relatively easily developed hair cracks due to discharge breakdown upon irradiation with electron beams, but the polyethylene also containing 1,4-butanediol could be cross-linked to a high degree upon irradiation with a low dose of electron beams without the formation of hair cracks and without any decrease in cross-linking rate.

TABLE 9

| | Additive (parts bt weight) | discharge breakdown dose[1] (Mrad) | gel %[2] |
|---|---|---|---|
| Example 9 | triallylcyanurate (2.0), di-n-hexylamine (0.2) 1,4-butanediol (1.0) | >36.0 | 75 |
| Control | triallylcyanurate (2.0) | 11.2 | 75 |
| | triallycyanurate (2.0), di-n-hexylamine (0.2) | 11.7 | 74 |

[1] >36.0 as a discharge breakdown dose indicates the absence of breakdown under irradiation with 36 Mrad of electron beam
[2] The proportion of polyethylene insoluble in boiling xylene after irradiation with 10 Mrad of electron beam; extraction period of 100 hours

What is claimed is:

1. In the process for cross-linking a shaped polyethylene by irradiating the polyethylene with electron beams having a maximum range smaller than the thickness of the polyethylene measured in the direction of transmission of electron beam, the improvement whereby Lichtenberg discharge is prevented comprising adding 0.2 to 2 parts by weight of an amine having a basicity of 9.5 pKb or less to 100 parts by weight of polyethylene prior to its irradiation with electron beams.

2. In the process for cross-linking a shaped polyethylene by irradiating the polyethylene with electron means having a maximum range smaller than the thickness of the polyethylene measured in the direction of transmission of electron beams, the improvement whereby Lichtenberg discharge is prevented comprising adding 0.2 to 1.0 part by weight of alcohol and 2 or less parts by weight of amine to 100 parts by weight of polyethylene prior to its irradiation with electron beams.

3. The process as claimed by claim 2 wherein the amine has a basicity of 9.5 in pKb or less.

4. The process as claimed by claim 1 or 2 wherein the amine is substituted by a hydroxyl or phenyl group.

5. The process of claim 2 wherein the alcohol has a melting point of 50° C. or less and a boiling point of 130° C. or more.

6. The process as claimed by claim 1, wherein the amine is added in an amount of 0.5 to 1 part by weight of amine to 100 parts by weight of polyethylene.

7. The process as claimed by claim 2, wherein the amine is added in an amount of 0.1 to 0.5 parts by weight of amine to 100 parts by weight of polyethylene.

* * * * *